United States Patent [19]
Ishida

[11] 3,963,245
[45] June 15, 1976

[54] APPARATUS FOR AUTOMATICALLY RETURNING A PICK-UP ARM IN A RECORD PLAYER

[75] Inventor: Shizuo Ishida, Tokyo, Japan

[73] Assignee: Trio Electronics Incorporated, Tokyo, Japan

[22] Filed: Nov. 14, 1974

[21] Appl. No.: 523,861

[30] Foreign Application Priority Data
Jan. 12, 1974  Japan.................................. 49-6839
Jan. 12, 1974  Japan.................................. 49-6840

[52] U.S. Cl. ............................. 274/15 R; 274/10 R
[51] Int. Cl.² ................................................ G11B 17/06
[58] Field of Search ............................. 274/10 R, 15

[56] References Cited
UNITED STATES PATENTS

| | | | |
|---|---|---|---|
| 3,671,045 | 6/1972 | Bara | 274/10 R |
| 3,697,087 | 10/1972 | Takahashi | 274/10 R |
| 3,801,109 | 4/1974 | Kolomayets et al. | 274/10 R |
| 3,847,401 | 11/1974 | Evans | 274/10 R |

Primary Examiner—Samuel B. Rothberg
Assistant Examiner—Charles E. Phillips
Attorney, Agent, or Firm—Gerald J. Ferguson, Jr.; Joseph J. Baker

[57] ABSTRACT

An automatic return apparatus for the pick-up arm of a record player including a cam plate for lowering the pick-up arm at the beginning of playback and for returning the arm at the end thereof. A crossed cam is rotatably mounted on the plate to engage the pick-up arm when it is being returned to its rest position and effect disengagement thereof at all other times. A four-armed lever for effecting various functions such as holding the cam plate in position during playback, actuating a muting switch during the return of the pick-up arm to its rest position, initiating the return of the pick-up arm return and resetting the apparatus for the next return of the pick-up arm is also provided.

11 Claims, 1 Drawing Figure

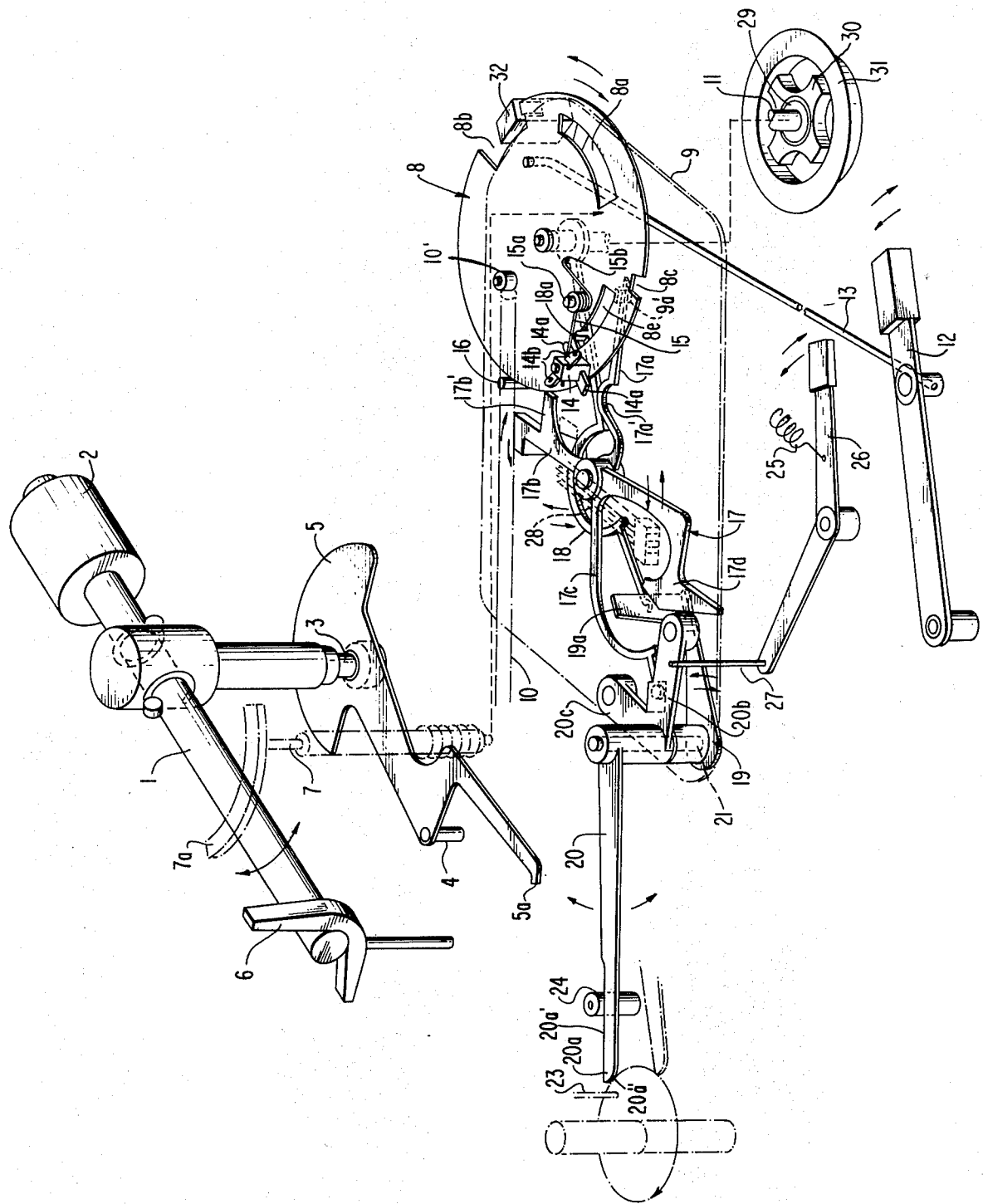

APPARATUS FOR AUTOMATICALLY RETURNING A PICK-UP ARM IN A RECORD PLAYER

BACKGROUND OF THE INVENTION

1. Field of the Invention

This invention is directed to an improvement in apparatus which automatically returns a pick-up arm or the like in a record player.

2. Discussion of the Prior Art

There have been well known automatic return apparatus for record players, in which, at the end of playback, the pick-up arm is automatically raised and laterally rotated to return it to its rest position. In addition to the complicated construction of the prior art apparatus, the automatic return mechanism together with the gear train or the like, which connects the pick-up arm to the automatic return mechanism, can easily be broken when the pick-up arm is in its rest position and is carelessly manually handled.

Further, there have been various types of automatic return apparatus for record players, in which, when a record has finished playing and a detecting means discriminates that the stylus of the pick-up head has reached the run-out groove of the record, some mechanism raises and rotates the pick-up arm, to actuate a muting switch, to return the detecting means, to turn off a power switch and to actuate other means. Due to the complicated construction and operation of such apparatus, there have been difficulties adjusting the operational timing. Further, the possibility of malfunction is substantial.

SUMMARY OF THE INVENTION

It is, therefore, an important object of the present invention to provide an improved automatic return apparatus for a record player, in which the pick-up arm may be separated from the mechanism for returning it by means of a relatively simple device when the record player is not in use.

It is, therefore, a further important object of the present invention to provide an automatic return apparatus of the above type for a record player system having a simple construction and reliable operation where certain means thereof serve multiple functions.

These and other objects of the invention will become apparent from a reading of the specification and claims taken with the drawing.

BRIEF DESCRIPTION OF THE DRAWING

The sole FIGURE of the drawing is a perspective view of an illustrative embodiment of an automatic pick-up arm return apparatus in accordance with the invention.

DETAILED DESCRIPTION OF THE PREFERRED EMBODIMENT

A pick-up arm 1 is shown in the drawing having a cartridge or pick-up head (not shown) at its front end and a counter weight 2. The pick-up arm 1 is supported rotatably in a vertical plane by a rotatable shaft 3 which is, in turn, rotatable in a horizontal plane. To the rotatable shaft 3 is secured a return-actuating means or plate 5 having a projecting portion 5a. The return-actuating plate 5 has a movable changeover post 4 mounted downwardly thereto. An arm rest 6 for the pick-up arm is provided together with an arm lifter 7 which has a supporting member 7a for bottom end of the arm 1 at its top. The bottom end of the arm lifter 7 is supported by a cam plate or return means 8.

The cam plate 8 is mounted rotatably on a chassis 9 by a shaft 11 and biased by a main spring or biasing means 10 in the counter clockwise direction. Main spring 10 is connected at one end thereof to post 10' and at its other end to a fixed point (not shown) within the record player. Cam plate 8 can be rotated clockwise by rotation of a starting lever or moving means 12 through a connecting rod 13. Cam plate 8 has a gradually inclined, depressed portion 8a on its upper surface, which is adapted to raise and lower arm lifter 7, which, in turn, is initially disposed adjacent one edge of depressed portion 8a as indicated by the dotted line in the Figure. Cam plate 8 also has a notch 8b, which is adapted to open and close a power switch 32. A notch 8c is also provided on its peripheral portion. Further, cam plate 8 is provided with an arc shape slot 8e coaxial with shaft 11. A crossed cam or switching means 14 having a square cross section is pivotally mounted on the outer peripheral portion of cam plate 8, and is releasably held in one of four possible angular orientations, in a manner which will be described in more detail hereinafter, by one end of a spring 15. Spring 15 is coiled about a post 15a mounted on plate 8 and then secured to a point 15b also on plate 8. The crossed cam 14 has a lower bar 14a which diagonally extends from two opposed corners of post 14, bar 14a being adapted to engage a fixed changeover post 16 secured to chassis 9. Cam 14 also includes an upper cam 14b disposed at right angles with lower cam bar 14a, which is adapted to engage movable changeover post 4. Bar 14b also diagonally extends from two opposed corners of post 14.

A lever 17 is also provided and includes radially projecting arm portions. These are first arm portion 17a, second arm portion 17b, third arm portion 17c and fourth arm portion 17d. The first arm portion 17a elastically engages a lug portion 9a secured on chassis 9 so that an arm extension portion 17b' second arm portion 17b is biased in the clockwise direction for eventual engagement with notch 8c of cam plate 8. Flexibility of arm 17a is enhanced by curved portion 17a'. Arm extension portion 17b' engages notch 8c after cam 8 has been sufficiently rotated as will be described hereinafter.

A reset arm 18 is rotatably retained at one end thereof on shaft 11 of cam plate 8, and is provided with an upturned portion 18a which slidably engages arc shape slot 8e of cam plate 8. An actuating arm 19 and a detecting arm 20 are pivotally mounted on an arm shaft 21. The detecting arm 20 is mounted on the actuating arm 19. Both detecting arm 20 and actuating arm 19 are rotatably mounted on shaft 21. Since detecting arm 20 is mounted on actuating arm 19, they are joined together by frictional force and thus they tend to move together. However, as indicated hereinafter, when a force in excess of the friction force is applied, arms 19 and 20 will move independently of each other to effect different operations. The actuating arm 19 is provided with an upstanding flange portion 19a, one side of which may engage projected portion 5a of return-actuating plate 5, and the other side of which may engage the far end of reset arm 18. The far end 20a of detecting arm 20 is positioned to abut against a trip pin 23 of the turntable and may engage a stop 24 secured to chassis 9. Further, the far end 20a of the detecting arm 20 comprises a straight part 20a' formed at the side of the stop 24 and the curve part 20a'' formed at the opposite side from the tip of the arm. The rear end of detecting arm 20 comprises elongated, V-shaped, portions 20b and 20c. The third arm portion 17c of lever 17 extends between elongated portions 20b and 20c so that the far end of third arm portion 17c may engage elongated portion 20b. The fourth arm portion 17d is also adapted to abut elongated portion 20b of the detecting arm. Furthermore, a pin 27 secured to a cutting lever 26 which is biased by a return-spring 25 is adapted to engage elongated portion 20b of detecting arm 20.

A muting switch 28 is actuated by second arm portion 17b of lever 17. A rotor 29 is mounted on the lower end of shaft 11. An impeller 30 may be connected to rotor 29 by means of a clutch device (not shown) only when the automatic return apparatus of this invention is operative. The impeller 30 is submerged in silicone oil contained in a cup 31 mounted on chassis 9.

The operation of the automatic return apparatus of this invention will now be described.

When the operator wishes to play a record, the record to be played is placed on the turntable and the pick-up arm 1 may be deposited on the particular position of the record to be played or this may be done automatically as described hereinafter. The starting lever 12 is rotated in the clockwise direction and thus cam plate 8 is rotated through the connecting rod 13 against main spring 10 in the clockwise direction. With rotation of cam plate 8, power switch 32 is released from engagement with notch 8b thereby turning it on, and thus the turntable starts to rotate. As cam plate 8 rotates, lower bar 14a of crossed cam 14 engages fixed changeover post 16 and then moves past it to counter clockwise rotate the crossed cam by 90°, to prepare upper bar 14b for eventual engagement with movable changeover post 4 and thus eventual reutrn of pick-up arm 1 to arm rest 6. Since first arm portion 17a of lever 17 elastically engages lug portion 9a and since cam plate 8 is rotated in the clockwise direction, arm extension portion 17b' of second arm portion 17b eventually engages notch 8c of cam plate 8 so that the cam plate cannot be rotated back by main spring 10.

As the cam plate rotates and prior to engagement of notch 8c by arm portion 17b, the lower end of lifter 7 is guided down the slope of depressed portion 8a of cam plate 8, and thus pickup arm 1 is lowered onto the record to be played. The lever 17 biased in the clockwise direction by the first arm portion 17a is rotated clockwise when arm extension portion 17b' engages notch 8c, second arm portion 17b turns muting switch 28 off. Third arm portion 17c of lever 17 disengages elongated portion 20b of detecting arm 20 so that the detecting arm may freely rotate around arm shaft 21. As cam plate 8 rotates, one end of arc shape slot 8e engages upturned lug portion 18a of reset arm 18 to rotate arm 18 in the clockwise direction and thus remove it from upstanding flange portion 19a of actuating arm 19 so that the actuating arm may also freely rotate around arm shaft 21.

It should be remembered, as stated above, that, during playback of a record, rotor 29 mounted on shaft 11 of cam plate 8 is disconnected from impeller 30. Thus, cam plate 8 can smoothly rotate to its latched position without resistance at the time playback is started.

As the pick up arm 1 approaches the end of the record, the projected portion 5a of the return-actuating plate 5, which rotates with pick-up arm 1, comes in contact with upstanding flange 19a of the actuating arm 19, thereby gradually rotating the actuating arm in the counter clockwise direction. Simultaneously, the detecting arm 20 connected frictionally with this actuating arm 19 is also rotated gradually in the counter clockwise direction.

Since the trip pin 23 is situated so as to abut about the center of the curved part 20a'' when the curved part 20a'' of the far end 20a of the detecting arm 20 comes to the tangent line of the circle drawn by the trip pin 23, the trip pin 23 slaps the curved part 20a'' when it enters slightly into the inside of the locus of the trip pin 23 while the detecting arm 20 gradually rotates and the trip pin circulates. At this time, a force is applied to the curved part 20a'' and slapped outwards by the circular motion of the trip pin 23, and thereby the detecting arm 20 is returned to stop 24. Then, even if the detecting arm 20 is returned to the stop pin 24 due to the slapping of the trip pin 23, the operation of the detecting arm 20 is not transmitted to the actuating arm 19 as any displacement is absorbed at the part which is frictionally connected. When the play of the record is finished and the stylus of the pick-up cartridge reaches the runout grooves of the record, inward movement of pick-up arm 1 abruptly and rapidly increases. Accordingly, detecting arm 20 is displaced by a large angle in the counter clockwise direction, and the tip of the straight part 20a' of the far end 20a crosses over the locus of trip pin while the trip pin circulates. Then trip pin 23 slaps and broadly swings the straight part 20a' of the detecting arm 20 in the counter clockwise direction.

Thus, elongated portion 20b of detecting arm 20 is also counter clockwise rotated and pushes fourth arm portion 17d of lever 17 in the counter clockwise direction. This, in turn, causes second arm portion 17b to turn muting switch 28 on. Arm extension portion 17b' of second arm 17b also disengages notch 8c of cam plate 8 so that the cam plate is rotated in the counter clockwise direction by the restoring force of main spring 10. During this time, rotor 29 on shaft 11 of cam plate 8 is coupled to impeller 30 by means of the clutch (not shown). Therefore, cam plate 8 slowly rotates due to the viscous resistance of the silicone in cup 31 for the impeller. As cam plate 8 rotates in the counter clockwise direction, the lower end of lifter 7 is guided up the slope of depressed portion 8a of cam plate 8 to raise pick-up arm 1 from the record surface. Further, upper bar 14b of crossed cam 14 engages movable changeover pin 4 to rotate return-actuating plate 5 in the counter clockwise direction to thus eventually return pick-up arm 1 to arm rest 6. As cam plate 8 rotates, crossed cam 14 is again counter clockwise rotated 90° since return-actuating plate 5 can no longer be rotated once pick-up arm is returned to rest 6, and thus upper bar 14b is rotated as it passes movable changeover pin to thereby clockwise rotate cam 14 90°. Thus, until cam plate 8 is again rotated in the clockwise direction with lower bar 14a of crossed cam 14 projecting from the cam plate, upper bar 14b of crossed cam 14 cannot engage movable changeover pin 4. That is, until lower bar 14a again engages changeover pin 16 thereby rotating cam 14 90°, crossed cam 14 cannot engage pin 4.

Returning to the counter clockwise rotation of lever 17, the third arm portion 17c clockwise rotates elongated portion 20b until it is stopped by engagement of detecting arm 20 with stop 24 whereby detecting arm 20 is returned to its starting position preparatory to playback to another record. Also, upturned lug portion 18a of reset arm 18 is rotated by arch shaped slot 8e in the counter clockwise direction so that the far end of reset arm 18 rotates upstanding flange portion 19a of actuating arm 19 to its starting position. With further rotation of cam plate 8 in the counter clockwise direction, notch 8b abuts power switch 32 to turn it off thereby stopping rotation of cam plate 8. Thus, operation for returning pick-up arm 1 to its reset position has now been described.

If playback is to be interrupted, a cutting lever 26 is pulled in the clockwise direction against a return-spring 25 to effect return of the pick-up arm. A pin 27 secured to cutting lever 26 will engage elongated portion 20b to rotate it in the counter-clockwise direction and thus push fourth arm portion 17d in the counter clockwise direction thereby releasing the latch on cam plate 8. The ensuing operation of the apparatus will be just the same as described hereinbefore. After triggering the return operation and after it is released, cutting lever 26 is returned to its original position by return-spring 35.

As has been described hereinbefore, the present invention provides an automatic return apparatus for a record player in which cam plate 8 raises and lowers lifter 7 for pick-up arm 1 by being rotated in opposite directions at the beginning and end of playback. On cam plate 8, crossed cam 14 is pivotally mounted, being supported by spring 15, so as to be rotated 90° each time lower bar 14a engages fixed changeover post 16 or upper bar 14b engages movable changeover post 4. Return-actuating plate 5 is secured to the pick-up arm 1 so as to rotate therewith. Movable changeover pin 4 mounted on plate 5 engages upper bar 14b of the crossed cam to rotate-actuating plate 5, as cam plate 8 rotates at the end of playback, so that pick-up arm 1 may be rotated laterally to return it to rest 6. Crossed cam 14 is then rotated the predetermined angle to disengage upper bar 14b from movable changeover pin 4. Thus, when the record player is not in the play mode, pick-up arm 1 is disengaged from its automatic return mechanism which includes members such as cam plate 8. Therefore, there will be none of the malfunction described hereinbefore even if pick-up arm 1 is carelessly manually rotated and the automatic return operation will be readily executed since rotation of cam plate 8 at the beginning of playback causes changeover pin 16 to rotate lower bar 14a by the predetermined angle so that upper bar 14b is also into the position where it can engage movable changeover pin 4. Furthermore, since crossed cam 14 not only has simple structure but is also mounted on the cam plate which raises and lower pick-up arm 1, the automatic return apparatus of the present invention may be simply constructed with a few parts.

As has been also described hereinbefore, the present invention also provides an automatic return apparatus for a record player in which cam plate 8, which may be rotated by starting lever 12 at the beginning of playback and may be rotated in the opposite direction by main spring 10 at the end of playback. During these times, cam plate 8 performs several functions such as raising and lowering lifter 7 for pick-up arm 1 at the beginning and end of playback, rotating pick-up arm 1 laterally to return, and turning power switch 32 on and off. Lever 17 is provided with first, second, third and fourth arm portions or lever arms 17a, 17b, 17c and 17d and is always biased to rotate in the clockwise direction by elastic lever arm 17a as it elastically engages lug 9a on chassis 9. Second lever arm 17b includes an extension 17b' which engages notch 8c of cam plate 8 to hold the plate stationary between the beginning and end of playback. Third lever arm 17c returns detecting arm 20 to its start position. Fourth lever arm 17d, in response to counter clockwise rotation of detecting arm 20 rotates lever 17 in the counter clockwise direction to disengage second lever arm 17b from the cam plate so that it may be returned to rest 6. Since the cam plate 8 and lever 17 perform several functions required for automatic return apparatus, less parts, especially parts for transmitting rotating motion are required. Thus, a simple structure and reliable operation are obtained without misadjustment of timing. It may be apparent that the cam plate 8 and lever 17 can be made of synthetic resins which are readily worked.

What is claimed is:

1. An automatic return apparatus for pick-up arm of a record player which includes at least a muting switch, said apparatus comprising
a chassis;
return actuating means connected to said pick-up arm for rotation therewith;
return means movably mounted on said chassis responsive to said return actuating means for returning said pick-up arm to its rest position, said return means including switching means movable to a first switch position for connecting said return means to said return actuating means and to a second switch position for disconnecting said return means from said return actuating means and said return means being movable from a first position at the start of play of a record to a second position and then back to said first position at end of play of said record;
biasing means for biasing said return means toward said first position;
moving means for moving said return means to said second position against the bias of said biasing means;
a lever rotatably mounted on said chassis having first, second, third and fourth lever arms;
a detector movably mounted on said chassis for detecting said end of play of the record, said detector being movable from a first detector position at the start of play to a second detector position at the end of play;
said first lever arm being elastic and in response to said return means biasing said lever in a predetermined direction;
said second lever arm (a) being biased against said return means to latch said return means in its said second position and (b) turning said muted switch off when said return means is latched in its said second position;
said third lever arm in response to said return actuating means moving said detector to its second position;
said fourth lever arm, in response to movement of said detector to its second position, rotating said lever in the direction opposite that of said predetermined direction to thereby (a) release said return means from said latching by said second lever arm to permit said return means to be returned to its first position by said biasing means and (b) turning said muting switch on and (c) cause said third lever art to return said detector to its first position;

said switching means, in response to said moving means moving said return means to its second position, being moved to its first switch position;

said switching means, in response to said return means being returned to its first position, engaging said return actuating means to return said pick-up arm to its said rest position; and said switching means, in response to said pick-up arm being returned to its rest position, being moved to its second switch position so that said return an actuating means is disconnected from said return means whereby the pick-up arm may be manually displaced from its rest position without damaging said return means.

2. An automatic return apparatus as in claim 1 including a fixed post mounted on said chassis where said return actuating means includes a movable post and said switching means includes (a) a cam post having at least one upper bar projecting from an upper portion of one side of said cam post and a lower bar projecting from a lower portion of a second side of said cam post, said cam post being rotatably mounted within said return means; and (b) second biasing means for releasably engaging said first and second sides of said cam post to releasably hold the post at two predetermined orientations corresponding to said first and second switch positions;

said lower bar engaging said fixed post, in response to said moving means moving said return means to its second position, to rotate the cam post against said second biasing means so that said switching means is moved to its first switch position;

said upper bar engaging said movable post, in response to said return means returned to its first position, to return said pick-up arm to its rest position;

said upper bar, in response to said pick-up arm being returned tp to its rest position, rotating the cam post against said second biasing means so that said switching means is moved to its second switch position.

3. An automatic return apparatus as in claim 1 where said record player includes a lifter for raising and lowering said pick-up arm from the record and where said return means comprises a plate rotatably mounted on said chassis, said switching means being mounted on said plate and said plate including an elongated, downwardly inclined portion, said lifter resting adjacent one end of said inclined portion when said return means is in its first position so that as said return means moves from its first to its second position, said lifter rides down said inclined portion to position the stylus of said pick-up arm on said record.

4. An automatic return apparatus as in claim 3 where record player includes a main power source and power switch therefor and where said return means inclines means for switching said power switch off when the return means is in its first position and for switching said power switch on when it is removed from said first position by said moving means.

5. An automatic return apparatus as in claim 1 where said second lever arm includes a projecting extension and where said return means comprises a plate rotatably mounted on said chassis, said plate having a notch in the periphery thereof, said extension engaging said notch when said return means is in it second position.

6. An automatic return apparatus for the pick-up arm of a record player, said apparatus comprising a chassis;

return actuating means connected to said pick-up arm for rotation therewith;

return means movably mounted on said chassis responsive to said return actuating means for returning said pick-up arm to its rest position, said return means including switching means movable to a first switch position for connecting said return means to said return actuating means and to a second switch position for disconnecting said return means from said return actuating means and said return means being movable from a first position at the start of play of a record to a second position and then back to said first position at end of play of said record;

biasing means for biasing said return means toward said first position;

moving means for moving said return means to said second position against the bias of said biasing means;

detector means responsive to said return actuating means for detecting said end of play of the record;

means for latching said return means in its said second position;

means responsive to said detector detecting said end of play for releasing said return means from said latching to permit said return means to be returned to its first position by said biasing means;

said switching means, in response to said moving means moving said return means to its second position, being moved to its first switch position; said switching means, in response to said return means being returned to its first position, engaging said return actuating means to return said pick-up arm to its said rest position;

said switching means, in response to said pick-up arm being returned to its rest position, being moved to its second switch position so that said return actuating means is disconnected from said return means whereby the pick-up arm may be manually displaced from its rest position without damaging said return means;

a fixed post mounted on said chassis; said return actuating means including a movable post and said switching means including (a) a cam post having at least one upper bar projecting from an upper portion of one side of said cam post and a lower portion of a second side of said cam post, said cam post being rotatably mounted within said return means; and (b) second biasing means for releasably engaging said first and second sides of said cam post to releasably hold the post at two predetermined orientations corresponding to said first and second switch positions;

said lower bar engaging said fixed post in response to said moving means moving said return means to its second position, to rotate the cam post against said second biasing means so that said switching means is moved to its first switch postion;

said upper bar engaging said movable post, in response to said return means being returned to its first position, to return said pick-up arm to its rest position;

said upper bar, in response to said pick-up arm being returned to its rest position, rotating the cam post against second biasing means so that said switching means is moved to its second switch position.

7. An automatic return apparatus as in claim 6 where said recorder player includes a lifter for raising and lowering said pick-up arm from the record and where said return means comprises a plate rotatably mounted on said chassis, said switching means being mounted on said plate and said plate including an elongated, downwardly inclined portion, said lifter resting adjacent one end of said inclined portion when said return means is in its first position so that as said return means moves from its first to its second position, said lifter rides down said inclined portion to position the stylus of said pick-up arm on said record.

8. An automatic return apparatus as in claim 7 where record player includes a main power source and power switch therefor and where said return means includes means for switching said power switch off when the return means is in its first position and for switching said power switch on when it is removed from said first position by said moving means.

9. An automatic return apparatus for a pick-up arm of a record player, said apparatus comprising
a chassis;
return actuating means connected to said pick-up arm for rotation therewith;
return means movably mounted on said chassis responsive to said return actuating means for returning said pick-up arm to its rest position, said return means being movable from a first position at the start of play of a record to a second position and then back to said first position at end of play of said record;
biasing means for biasing said return means toward said first position;
moving means for moving said return means to said second position against the bias of said biasing means;
a lever rotatably mounted on said chassis having first, second, third and fourth lever arms;
a detector movably mounted on said chassis for detecting said end of play of the record, said detector being movable from a first detector position at the start of play to a second detector position at the end of play; and
said first lever arm being elastic and in response to said return means biasing said lever in a predetermined direction;
said second lever arm (a) being biased against said return means to latch said return means in its said second position;
said third lever arm in response to said return actuating means moving said detector to its second position;
said fourth lever arm, in response to movement of said detector to its second position, rotating said lever in the direction opposite that of said predetermined direction to thereby (a) release said return means from said latching by said second layer arm to permit said return means to be returned to its first position by said biasing means and (b) cause said third lever arm to return said detector to its first position.

10. An automatic return apparatus as in claim 9 where said record player includes a muting switch and where said second lever arm (a) turns said muting switch off when it latches said return means in its second position and (b) turns said muting switch back on, in response to said lever being rotated in said direction opposite to that of said predetermined direction.

11. An automatic return apparatus as in claim 9 where said second lever arm includes a projecting extension and where said return means comprises a plate rotatably mounted on said chassis, said plate having a notch in the periphery thereof, said extension engaging said notch when said return means is in its second position.

* * * * *